United States Patent [19]

Allain

[11] Patent Number: 4,916,776
[45] Date of Patent: Apr. 17, 1990

[54] METHOD AND APPARATUS FOR PROCESSING SHRIMP

[75] Inventor: Reid P. Allain, Marietta, Ga.

[73] Assignee: Robert B. Kennedy, Atlanta, Ga. ; a part interest

[21] Appl. No.: 409,948

[22] Filed: Sep. 20, 1989

Related U.S. Application Data

[63] Continuation-in-part of Ser. No. 288,425, Dec. 22, 1988.

[51] Int. Cl.⁴ .............................................. A22C 29/00
[52] U.S. Cl. ............................................. 17/71; 17/73
[58] Field of Search ......................... 17/71, 72, 73, 48

[56] References Cited

U.S. PATENT DOCUMENTS

| | | | |
|---|---|---|---|
| 2,781,544 | 2/1957 | Skrmetta | 17/2 |
| 2,818,598 | 1/1958 | Skrmetta | 17/9 |
| 2,976,564 | 3/1961 | Skrmetta | 17/2 |
| 3,024,490 | 3/1962 | Skrmetta | 17/2 |
| 3,031,714 | 5/1962 | Skrmetta et al. | 17/2 |
| 3,070,833 | 1/1963 | Skrmetta | 17/45 |
| 3,414,934 | 12/1968 | Skrmetta et al. | 17/2 |
| 3,629,904 | 12/1971 | Zober | 17/71 |
| 3,696,466 | 10/1972 | Letchworth | 17/71 |
| 3,784,007 | 1/1974 | Skrmetta | 209/85 |
| 3,897,610 | 8/1975 | Lapeyre | 17/71 |
| 3,932,914 | 1/1976 | Lapeyre | 17/71 |
| 4,016,625 | 4/1977 | Mitchell | 17/71 |
| 4,531,261 | 7/1985 | Sanaka | 17/71 |
| 4,692,965 | 9/1987 | Stephenson | 17/71 |

Primary Examiner—Willis Little
Attorney, Agent, or Firm—Thomas & Kennedy

[57] ABSTRACT

Shrimp are conveyed in upright orientation upon a pair of spaced rails that revolve in upright planes and which strike bumpers. The shirmp may be size sorted by orienting the rails such that their spacing changes. The shirmp are deheaded by conveying then to a deheader that has a pinch finger that swings by a pinch block and clamp.

16 Claims, 9 Drawing Sheets

METHOD AND APPARATUS FOR PROCESSING SHRIMP

REFERENCE TO RELATED APPLICATION

This is a continuation-in-part of application Ser. No. 288,425 filed Dec. 22, 1988 now pending.

TECHNICAL FIELD

This invention relates generally to methods and apparatuses for processing crustaceans, and particularly to methods and apparatuses for conveying, sorting and deheading shrimp on an automated basis.

BACKGROUND OF THE INVENTION

Heretofore crustaceans have been conveyed from one location to another on common conveyor belts, in vibrating troughs, and through conduits and the like. However, when shrimp are conveyed in this manner they arrive at their destination in random orientations. Thus, these forms of conveyances are ineffective for use in sorting and deheading shrimp which must be properly presented and oriented to processing devices such as sorters, deheaders, deveiners, and the like.

Specially designed mechanisms such as push bars and pawls have been associated with conveyors in an attempt to orient shrimp properly for processing. These however have proven to be unreliable and have enjoyed no significant commercial success. Exemplary of such prior art attempts at automating shrimp processing are those machines and methods disclosed in U.S. Pat. Nos. 3,696,466, 3,784,007, 3,897,610, 4,016,625, and 4,692,965.

Accordingly, it is seen that a need has long existed for methods and apparatuses for processing shrimp on an automated basis, and particularly to methods and apparatuses for conveying, sorting and deheading shrimp in a commercially efficient and effective manner. It is to the provision of such methods and apparatuses therefore that the present invention is primarily directed.

SUMMARY OF THE INVENTION

It has now been discovered that shrimp may be conveyed in single file formation and in upright orientations by depositing them in an elongated gap supported upon two gap-defining rails which are revolved in an upright plane oriented along the rails. This movement of the rails has been found to cause the shrimp to advance along the rails even with the rails oriented along inclines or declines. Moreover, the shrimp are conveyed in upright orientations so that they may be properly presented to processing devices such as deheaders. Preferably, the rails contact bumpers as they revolve. The shrimp may be size sorted by merely mounting the rails so that the gap between them widens in the direction of shrimp advance. The deheader is of a pinch type which comprises a pinch block mounted between the rails and a pinch finger that is driven along a path of travel passing closely adjacent to the pinch block.

DETAILED DESCRIPTION

Figure 1:
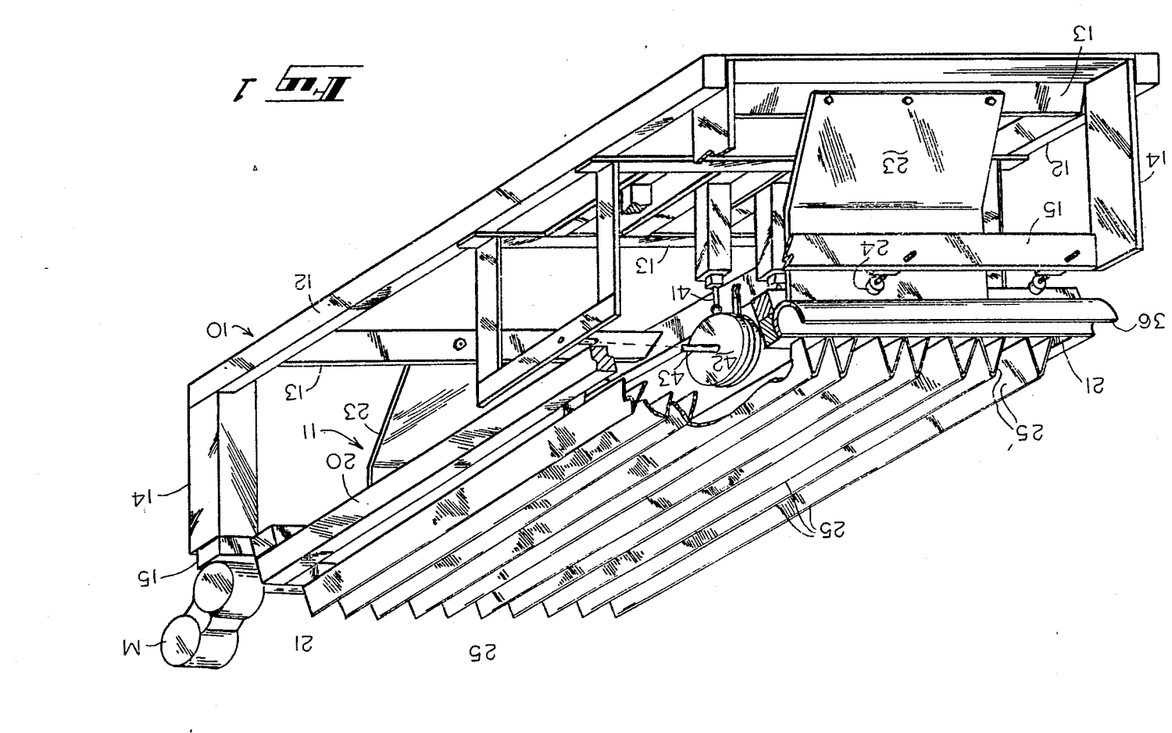
FIG. 1 is a perspective view of shrimp processing apparatus that embodies principles of the invention in a preferred form and which may be used in practicing methods of the invention.

With reference next to the drawing, there is shown in FIG. 1 apparatus for processing shrimp which comprises a base frame, indicated generally at 10, upon which a carriage, indicated generally at 11, is movably supported. The frame 10 comprises a pair of elongated side beams 12 to which lower cross beams 13 are mounted at opposite ends. The frame also includes upright members 14 to which upper cross beams 15 are mounted.

The carriage 11 has a carriage frame comprised of elongated side beams 20 to the ends of which cross beams 21 are mounted. The carriage is movably supported upon the frame 10 by means of a pair of flexible hinge plates or flex plates 23 which are secured at their bottom ends to the cross beams 13 and at their top ends to the cross beams 21 of the carriage. Since the hinge plates flexibly move, they may be characterized as being part of the carriage or the carriage support. Resilient bumpers 24 are mounted to one of the base frame cross beams 15 for contact with on of the hinge plates 23 during movement of the carriage. Thus, bumping contact with the hinge plate against the bumpers 24 is deemed to constitute operative contact with the other members of the carriage.

With continued reference to FIG. 1, the carriage is seen further to include five pairs of inverted V-shaped rails that extend lengthwise in side by side relation. One specific pair of rails is identified in FIG. 1 at 25'. The rails are spaced apart to provide an elongated gap therebetween. Each pair of rails has two substantially flat surfaces that face each other and which provide an elongated gap therebetween. Each pair also has two non-operational flat surfaces that face away from each other. Alternatively, the rails may be assembled so that opposite faces of individual inverted V-shaped rails are both used in defining a side of two adjacent gaps. Note that the rails are not exactly parallel so that the elongated gap between them widens in one direction.

Figure 2:
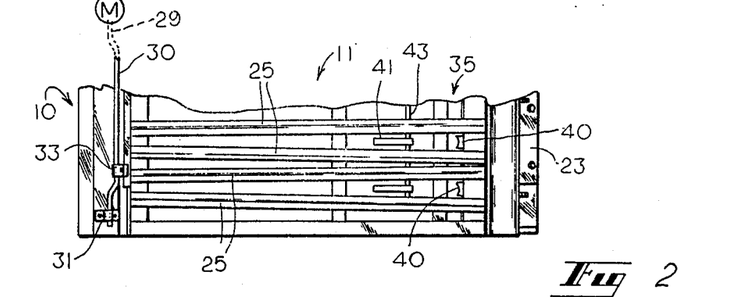
FIG. 2 is a top view of a portion of the apparatus illustrated in FIG. 1.
Figure 3:
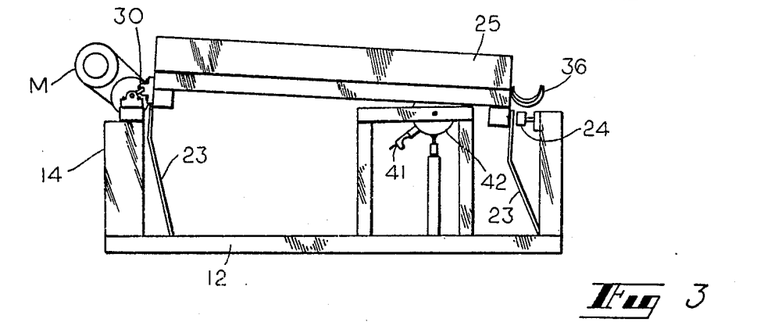
FIG. 3 is a side elevational view of the apparatus illustrated in FIG. 1.

Means are also provided for moving the carriage 11 and the rails 25 upon the stationary frame 10 which includes an electric motor M mounted to a cross beam 15 of the frame 10 adjacent one end of the carriage. As best shown in FIGS. 2 and 3, the output shaft 29 of the motor M is coupled with a crankshaft 30 that is offset from the axis of rotation of the motor drive shaft 29. The end of the crankshaft 30 located distally from the motor M is journaled through a pillow block bearing 31 which is mounted axially aligned with the axis of the motor output shaft 29. The crankshaft 30 is itself journaled through bracket-type bearings 33 which are mounted to a carriage cross beam. Thus it is seen that operation of the motor causes the crankshaft 30 to revolve about the axis of the motor power output shaft 29. This causes each pair of rails 25 to revolve in an upright plane with the hinge plate 23 that supports this end flexing accordingly. Since one end of the rail pairs are not driven, but merely rock upon a hinge plate, the movement of that end is merely reciprocal rather than revolutionary.

The motor output shaft 29 is driven in a clockwise rotary direction as viewed in FIG. 3 at a preferred speed of between 3800 and 4800 RPM and with the circular orbit of the crankshaft preferably being between 30 and 70 mils diameters. Alternatively, both ends of the carriage and rails may be motor driven as just described whereupon the entire length of the rails follow a revolutionary orbit. As another alternative the motor M may be mounted at the opposite ends of the rails.

With continued reference to the drawing the apparatus is seen to include 5 identical means for deheading shrimp conveyed on each of the five pairs of rails. These means are located at shrimp deheading stations, one of which is indicated generally at 35 in FIGS. 5 and 8 adjacent to a shrimp collection trough 36 that extends by all five of the deheading means. This trough is mounted to the end of the carriage located adjacent the hinge plate 23 that engages the bumpers 24. Each deheader includes a pinch block or stop 40 which is mounted between a pair of rails 25 adjacent to an upper lip of the trough 36. If desired, the pinch block may form an extension of the trough lip. The deheader mechanism also includes a pinch finger 41, having a resilient flipper 44 mounted to its end. The finger is mounted to a fly wheel 42 which itself is mounted loosely upon an axle or shaft 43 that extends across the carriage as shown in FIG. 1. The axle 43 is rotatably supported on the frame 10 and is driven by an electric motor which that is hidden from view in FIG. 1. The axial position of the fly wheel 42 along shaft 43 is maintained by conventional collars or keys.

Figure 8:
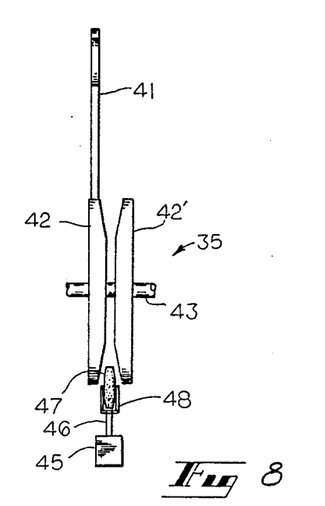
FIG. 8 is an end elevational view of the deheading station which illustrates the pinch finger shown in FIG. 7 together with means for driving it.

The wheel 42 may be clutched into and out of operative engagement with the drive shaft 43 so as to be driven in unison therewith by means of the clutch mechanism shown in FIG. 8. This mechanism includes another fly wheel 42' which is permanently mounted to the shaft 43 spaced slightly from the wheel 42 to which the pinch finger 41 is secured. Clutching is achieved by actuation of a solenoid indicated generally at 45 in FIG. 8. The solenoid repositions a plunger 46 to which a friction wheel 47 is mounted for free rotation in a fork 48. Therefore, upon actuation of the solenoid the friction wheel 47 is moved into engagement with confronting beveled surfaces of the two wheels 42 and 42' whereupon the fly wheel 42, to which the pinch finger is rigidly mounted, is held to the fly wheel 42' and is thereby driven by it until declutched by solenoid deactivation. When the fly wheel 42 is clutched into engagement with the wheel 42', the pinch finger 41 is driven from a position located downwardly in breaking and holding contact with a rubber pad mounted upon a side of the housing of the relay 45 until the solenoid is deactivated. Once this occurs the pinch finger becomes again gripped by the pad oriented downwardly.

Figure 10:
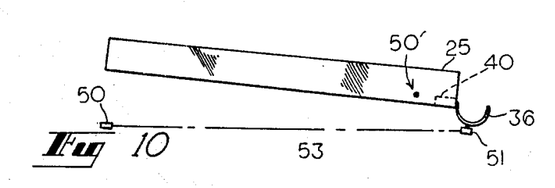
FIG. 10 schematically illustrates a shrimp position detector portion of the apparatus illustrated in FIG. 1.
Figure 11A:
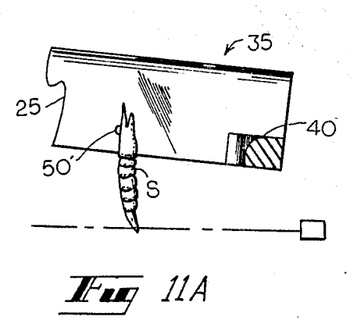
FIGS. 11A-11C illustrate a sequence of events that occurs during a deheading operation.
Figure 11B:
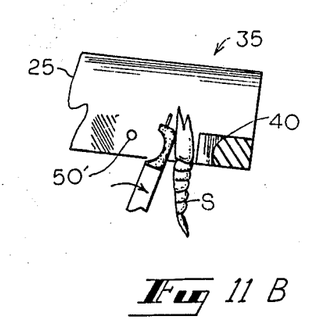
Figure 11C:
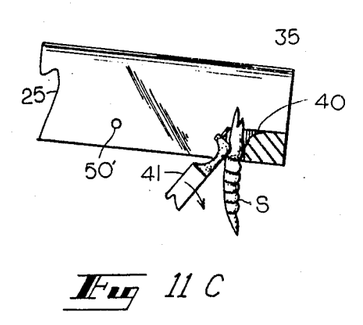

Operation of the deheader by the solenoid 45 is initiated by the detection of a shrimp as being located in close approach to or in actual contact with the pinch block 40. Detection is provided by means of a conventional photoelectric detector system as schematically shown in FIG. 10. Here the photoelectric system is seen to include an infrared light source 50 mounted beneath one end of each pair of rails 25 and an infrared light detector 51 mounted beneath the trough 36 so as to provide a beam of light 53 that is oriented at a slight angle with respect to the bottom of the rails 25. Another such system may be provided as indicated at 50' to cast a beam transversely to the rails. As a shrimp moves along the rails in close approach to the deheading station 35, it moves into a position blocking the beam 53. This is shown first occurring in FIG. 11A. This detection actuates an electronic control circuit, as hereinafter described, which actuates the solenoid 45, after a short time delay, which causes the pinch finger 41 to swing. The provision of the second photoelectric sensor system 50' may provide a backup to the system 50/51 or be used where no time delay is desired.

Figure 12:
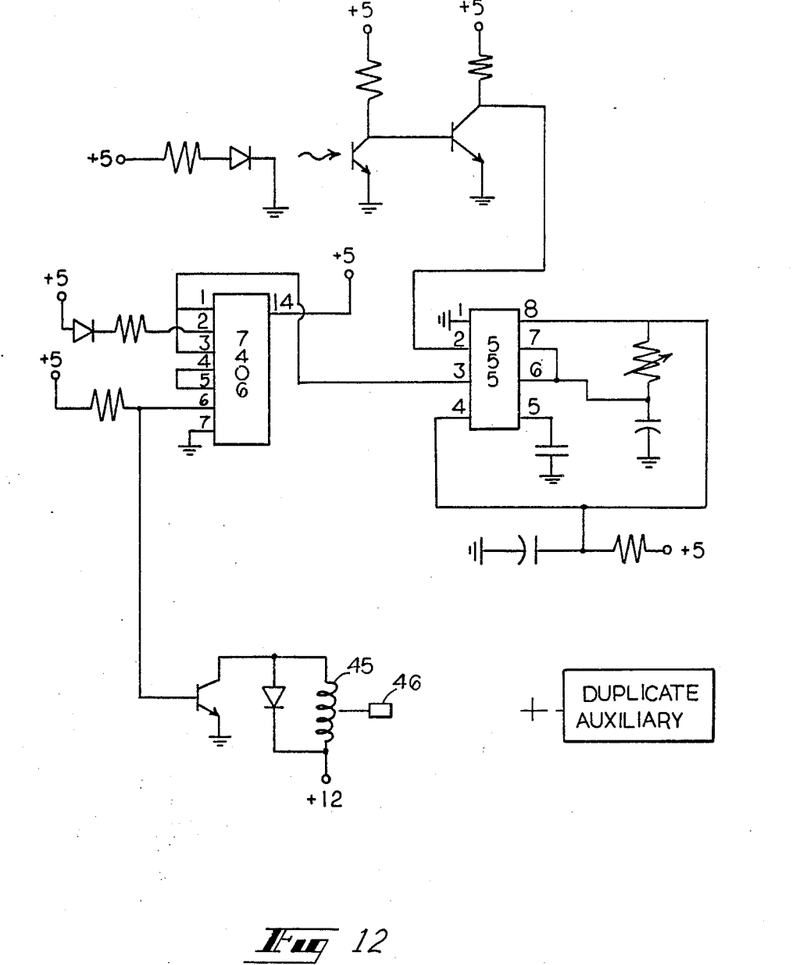
FIG. 12 is a schematic diagram of the electronic circuit used in controlling the apparatus illustrated in FIG. 1.

The electronic control system conventionally comprises a 555 IC timer to effect a time delay and a 7406 IC driver. The signal output line from the detector 51 is connected to the base of a transistor T1 which has its collector connected to a 5 VDC power source through a resistor R3. Its collector is also connected to pin 2 of the timer which has its pin 1 directly grounded and its pin 5 grounded through a capacitor C1. Pins 4 and 8 of the timer are connected to ground through another capacitor C2 and to a power source through a resistor R4. The timer, which here is operated in a monostable mode, is set by means of an adjustable resistor R5 that is connected across pins 6 and 7 and to ground through an electrolytic capacitor C3.

The 7406 driver has its pins 1 and 3 connected to pin 3 of the timer. A circuit check LED 59 is connected to pin 2. Where the auxiliary detector 50' is used its output signal may be inputted directly to pins 1 and 3 of the driver. Pin 6 of the driver is connected to the base of a transistor T2 to switch on the solenoid 45 across which a diode 52 is connected. This action moves the plunger 46 thereby clutching the pinch finger 41 into driving engagement with the shaft 43. A set of operative values for the circuit components is as follows:

R1: 150 ohms
R2: 4.7K ohms
R3: 4.7K ohms
R4: 56K ohms
R5: 1M ohms
R6: 300 ohms
R7: 4.7K ohms
C1: 0.01 μF
C2: 47 μF
C3: 10 μF
T1: 2N 222
T2: 2N 222

In operation, when the beam 53 is broken by a shrimp approaching the deheading station, the photo detector 51 turns on and drives the transistor T1 on thereby grounding pin 2 of the timer. When pin 2 is grounded pin 3 goes high which drives pins 2 and 4 of the driver low at a delay established by the setting of the variable resistor R5. The circuit check light emitting diode 59 is activated which may be used as a counter. Pin 4 going low drives pin 6 high which switches on transistor T2. This energizes the solenoid 45 which clutches the deheader wheel 42. When the shrimp is deheaded its body falls down from the rails whereupon continuity of the beam 53 is reestablished which deactuates the circuit until the next successive shrimp breaks the beam.

Figure 6:
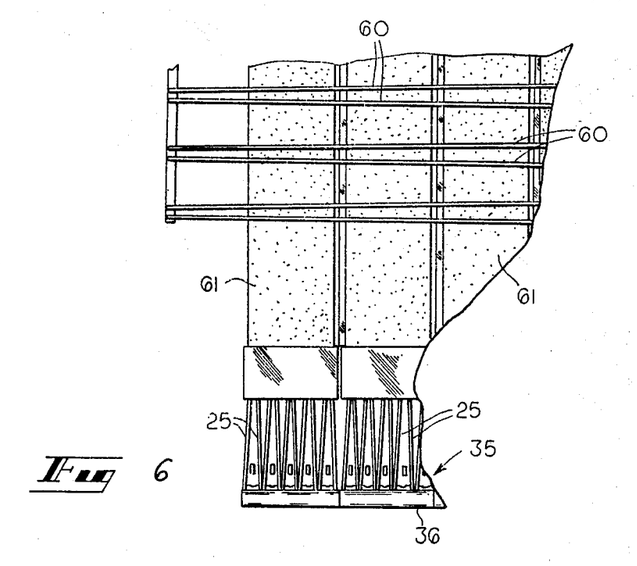
FIG. 6 is a plan view of sorting and conveying equipment shown positioned adjacent a portion of the apparatus of FIG. 1 which may be used in conveying shrimp thereto.
Figure 7:
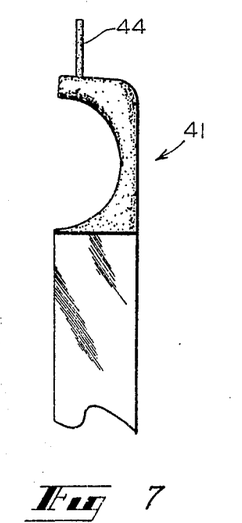
FIG. 7 is an enlarged side elevational view of a portion of the deheader pinch finger shown in FIG. 5.

With reference to FIG. 6 it is seen that the apparatus just described may be ganged together with others and used for deheading shrimp of different size categories. Multiple uses of the invention are made here. When the pairs of rails 60 are driven in the same revolutional manner as previously described, shrimp deposited on them advance along the rails over a series of conveyor belts 61 which move along an endless path of travel beneath the rails. Since the rails become spaced wider as they extend from left to right in this figure, shrimp of smaller size tend to fall upon the left conveyor belts while shrimp of larger size fall on others of the conveyor belts. From here the shrimp are delivered by the belts onto the rails 25 of ganged apparatuses of the type shown in FIG. 1 whose longitudinal gaps differ slightly in widths to accommodate the differences in shrimp sizes. Thus, each set of five pairs of rails handle shrimp of a particular size range for both increased reliability of operation as well as for sorting purposes.

With reference next to FIGS. 9A–9D and 9E the movement of the rails may be best visualized during one cycle of operation. In each of the figures here the left end of the rails is that which is coupled with the motor M while the opposite end is the one located adjacent a bumper 24 and the deheading station. The left end of the rails thus are being revolved in the plane of the paper upon which these figures are drawn so that at least this end of the rail revolves in a circular orbit about a generally horizontal axis. This revolutionary movement tapers to approximately linear reciprocal movement at the other end that merely is supported upon a flex plate. The positions shown in FIGS. 9A–D correspond to the positions of the rails indicated in FIG. 9E where the lower left corner 25 of the rails is shown in each of four positions A–D. Thus in FIG. 9A the lower left end corner of the rails is shown to be located in its extreme left position at neutral elevations.

Figure 9A:
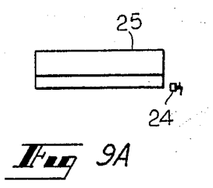
FIGS. 9A-9D and 9E schematically illustrate the orientation of rail members of the apparatus during stages of their revolution.
Figure 9B:
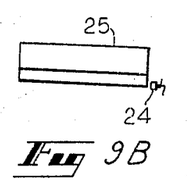
Figure 9C:
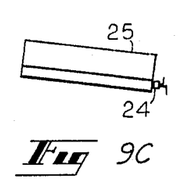
Figure 9D:
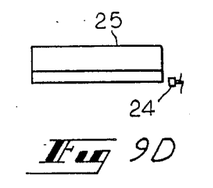
Figure 9E:
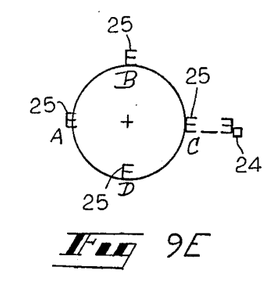

As the crankshaft 30 of the motor M moves upwardly (as viewed in FIG. 3) and to the right, the rails are both lifted and moved toward the right and toward the bumper 25 until they reach the position illustrated in FIG. 9B, which corresponds with its location B shown in FIG. 9E. Continued movement of the crankshaft causes the rails to move further to the right with a descending motion until the rails contact the bumper 24 as shown in FIG. 9C and location C in FIG. 9E. This is just before the rails have reached their furthermost position to the right. From here the rails descend to their lowermost position D in FIG. 9D and away from the bumpers and finally back to position A.

It appears that when the rails upon which the shrimp are slidably supported are driven at a suitable speed and with suitable longitudinal translation or stroke length provided by the crankshaft, or by a cam or similar mechanism, their revolutionary path of travel generates a net momentum in the shrimp such as to propel them in one direction along the rails. Should this revolutionary motion be conducted at too low a speed the shrimp merely rise and fall without advancement made upon the rails. Conversely, too high a speed can prove to be disruptive. Merely vibrating the shrimp has never been found to be effective since their physical make-up enables them to absorb the vibrations. A speed of 3800 to 4800 RPM has been found to work well in conjunction with a lateral displacement, i.e. crankshaft orbit diameter, of 30 to 70 mils. This revolutionary motion of the shrimp supports, in combination with the forces of gravity, causes the shrimp to advance in one direction.

With reference again to FIG. 9E it may be seen as the rails move from the position A to the position B both vertical and left to right vectorial components of force are imparted to them. This causes the shrimp to be lifted and moved to the right. From the position B to the position C the rails supports still move to the right but also descend. This in effect causes the shrimp to be propelled to the right with less weight imparted by them upon the rails which are in the process of dropping out from under them. Thus their momentum here causes the shrimp to move to the right in a sliding or in a combined airborne/sliding mode of travel with respect to the rail supports. This apparently continues even as the rails move from position C to position D because at least early in this portion of the cycle the shrimp exert very little weight upon and frictional engagement with the rails. Therefore, by the time the shrimp reassert their full weight upon the rails, the rails are once again cycling upwardly causing the shrimp to be lifted from position D to A. Thus even though the vectorial components of motion and acceleration balance out during a complete cycle, the associated gravational forces combine with the revolutional movement of the rails to cause net displacement of the shrimp to the right.

Where the just described revolutionary movement is combined with the abrupt forces generated by contacts of the rails with the bumpers at a position 9C, the rails abruptly deaccelerate here. Where rail movements to the right in FIG. 9 is deemed as being their outstrokes, and their movements to the left as being their backstrokes, their contact with the bumpers cause them to deaccelerate more at the end of their outstrokes than at the end of their backstrokes. This action has been found to enhance the propulsion that the shrimp experience when supported upon the revolving rails. Thus with the provision of the bumpers a good advance rate may be achieved at lower RPM speeds. This just described method of conveying the shrimp is found to work with rails oriented generally horizontally as well as on a decline in the direction of shrimp conveyance and even with the rails oriented at significant degrees of incline.

Figure 4:
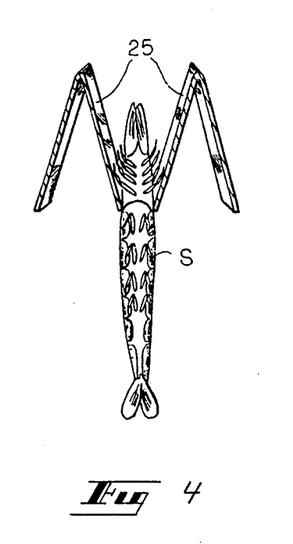
FIG. 4 illustrates a shrimp being conveyed uprightly along a pair of rails members of the apparatus illustrated in FIG. 1.

With the shrimp deposited onto one end of the rails they are initially at various orientations. Quickly however they assume a generally upright orientation with their tails depending out from the bottom of the elongated gap between the rails. As the gap widens the shrimp ride in a position nested somewhat lower on the rails until they are in a position as shown in FIG. 4 preparatory for deheading. Preferably, for minimization in meat attachment to head after severance, their rotary position (almost a vertical axis) is as shown with their feelers adjacent the block. Thus, the shrimp are not only individually conveyed in single line formation they are also conveyed in a predictably upright orientation for processing.

Figure 5:
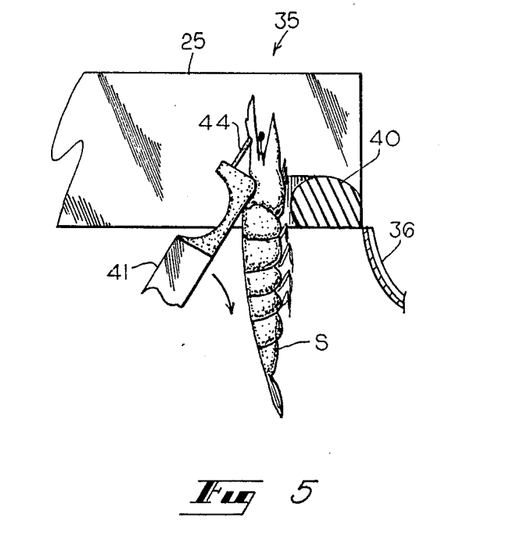
FIG. 5 is a side elevation view showing a single shrimp positioned at a deheading station of the apparatus illustrated in FIG. 1 in the process of being deheaded.

Once the shrimp reach a position in close proximity with the pinch block, the pinch finger is actuated whereupon it swings, as shown in FIG. 5, into contact with the head of the shrimp adjacent its juncture with the first body section. With the head urged firmly against the pinch block the finger moves just past the block, e.g. with a 2 mils spacing at the closest approach. At this point the body is severed and falls. The resilient flipper 44 on the top of the finger flips the severed head over the top of the pinch block and into the collection trough.

Figures 14, 15:
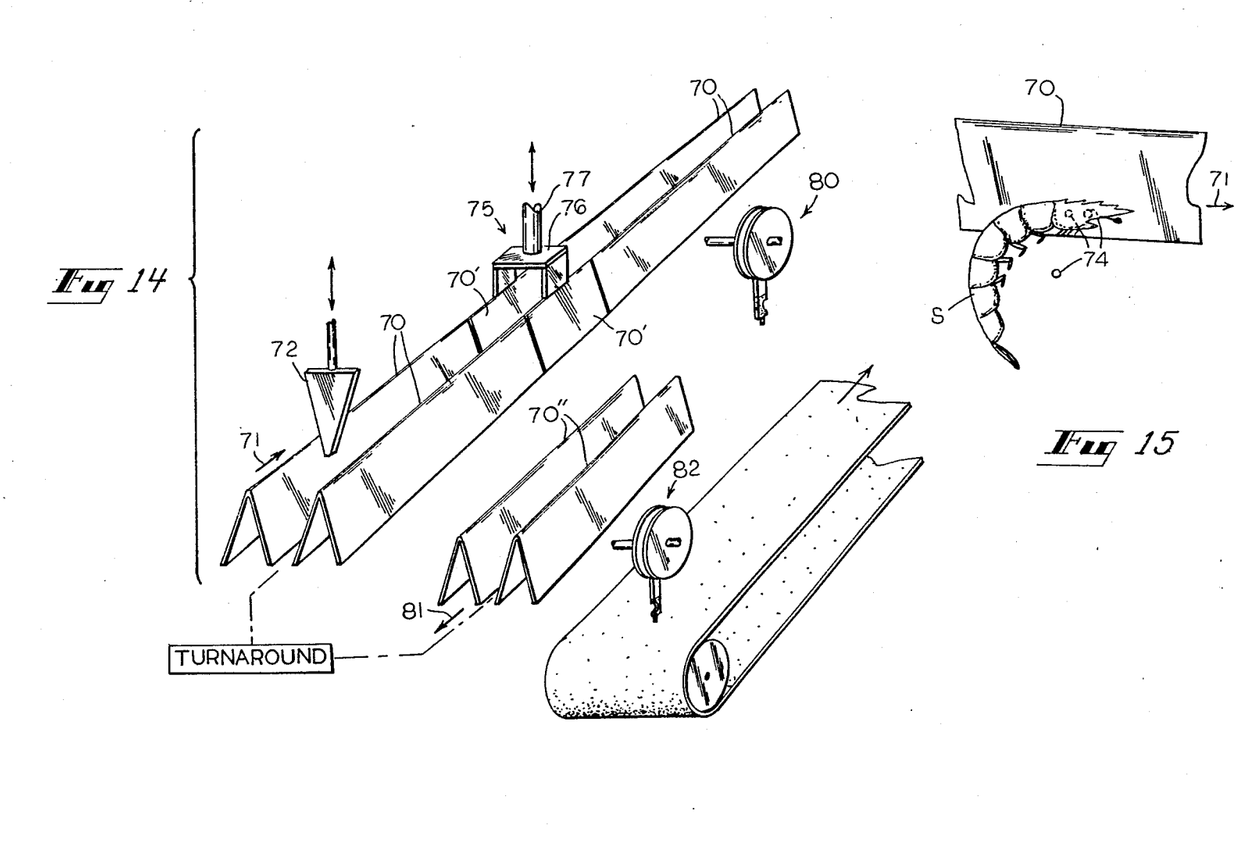
FIG. 14 is a diagram of a shrimp routing system that may be used in practicing the invention.
FIG. 15 illustrates a photodetector arrangement for use in sensing the orientation of shrimp as they are conveyed.

With reference next to FIGS. 14 and 15, a shrimp routing system is shown for deheading shrimp that are oriented both forward and rearward facing as they are conveyed. Here shrimp are deposited on a pair of conveyor and support rails 70 which are driven as previously described so as to cause the shrimp to be advanced in the direction of arrow 71. They are spaced apart in single file formation by means of a timing gate 72 that is periodically raised and lowered. Shrimp orientation is sensed photoelectrically as shown in FIG. 15 by means of three photodetectors 74 located just downstream of the gate 72 in association with unshown light beam generating means. Where a shrimp is forward facing, i.e. moving head first, its head blocks the two upper detectors prior to its tail blocking the lower one as it advances along the rails. Conversely, a shrimp that is rearwardly facing, i.e. advancing tail first, blocks the lower detector prior to blocking the upper ones. In this manner shrimp orientation is determined prior to shrimp arrival at a drop switch indicated generally at 75.

The drop switch comprises a small section of rails 70′ that is normally located coextensive with the other portions of the rails 70. A bridge mount 76 is rigidly mounted to the top edges of the rail sections 70′. A lift rod 77 is in turn affixed to the bridge mount and to unshown drive means for raising and lowering the rails section in response to the sensed orientations of the shrimp. If a shrimp is sensed as being forward facing, or at least not sensed as being rearwardly facing, the rails section 70′ is not moved from its in-line position with the rest of the rails. Conversely, if a shrimp is determined as being rearwardly facing, the drop switch is activated by an unshown controller and the rails section 70′ is lifted briefly. In this manner forwardly facing shrimp are conveyed to a deheader 80 while rearwardly facing shrimp are dropped off of the rails 70 through the gap created by the lifting of rails section 70′ and onto subrails 70″ which convey the shrimp in the opposite direction indicated by arrow 81 to a deheader 82. Alternatively, shrimp on subrails 70″ may simply be returned and redeposited onto the rails 70 upstream from the gate 72 by a turnaround route. The shrimp tails fall from the deheaders 80 and 82 onto a common conveyor belt while their heads are deposited into two unshown collection bins.

With reference next to FIGS. 13A–13F, apparatus for deheading shrimp in another preferred form is shown which here includes means for positively holding or clamping the shrimp heads to a pinch block as the body is severed from the head. Again the deheading apparatus is located between a pair of elongated rails 84 of the previously described type. Here however they are stationary at the deheading station itself with shrimp movement being effected by a water spray means 85 after having been deposited on the rails in front of the spray. A pinch block 86, made of an ultra high molecular weight polyester, having a hard, slick or waxed surface texture, is rigidly mounted on the lower end of a pivot arm 87. The arm is mounted for pivotal, arcuate movement about a pivot 88 within the elongated gap between the pair of rails 84. It is controlled by a pull solenoid 90, by a push solenoid 91, and by a spring 92. The pinch block 86 has a concave surface 94 that faces oncoming shrimp from upstream and which terminates with a tine or catch 99. It also has a cavity 95 in a lower surface defined at one end by a hook-like projection or spade 96.

The deheading apparatus further includes a clamp 100 mounted to a pivot 101 driven by a solenoid 102. By operation of the solenoid 102 the clamp may be pivoted clockwise so that a shrimp may pass clearly beneath it as it is advanced to the right and then pivoted clockwise to clamp it to the pinch block. Finally, a pinch finger 104 is provided as previously described.

Figure 13A:
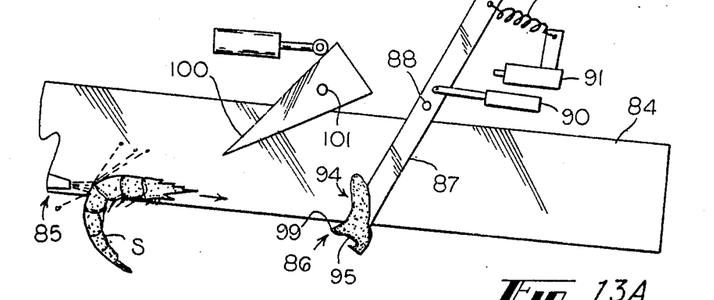
FIGS. 13A-13F illustrate a sequence of events that occurs during a deheading operation with shrimp deheading apparatuses that embodies principles of the invention in another form.
Figure 13B:
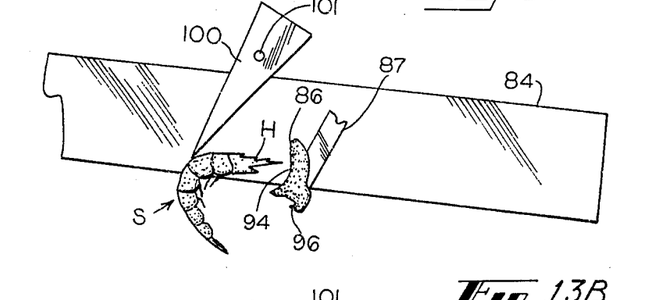
Figure 13C:
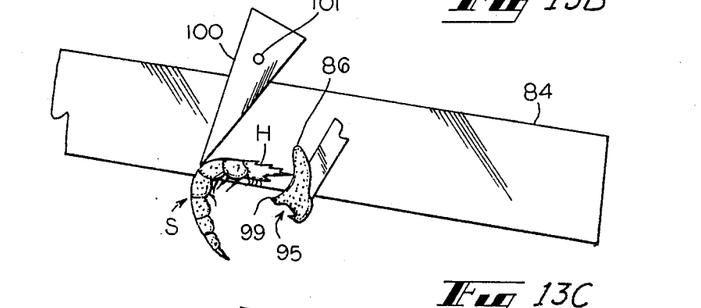
Figure 13D:
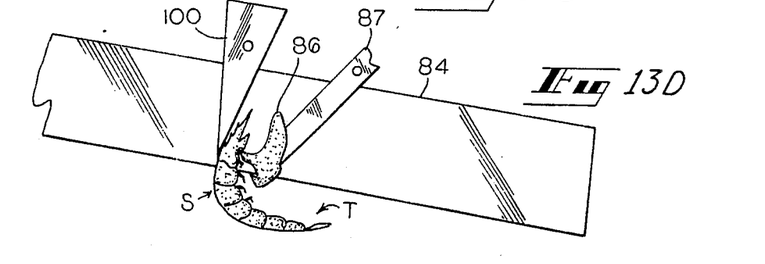
Figure 13E:
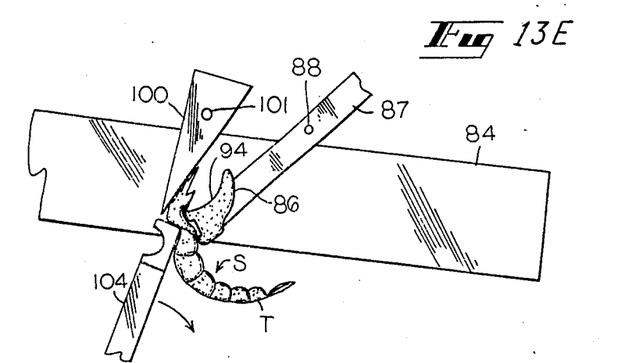
Figure 13F:
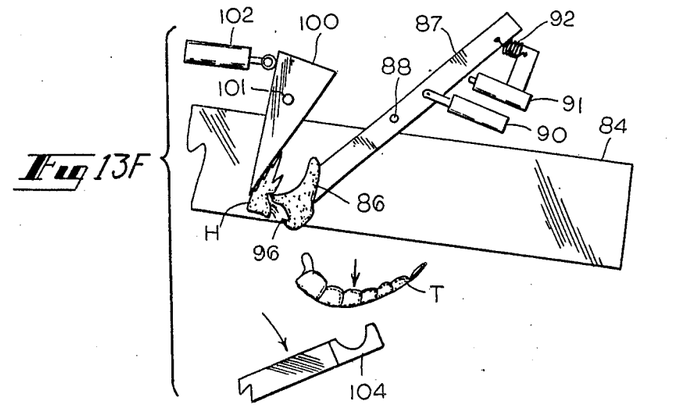

A deheading operation may be visualized by viewing FIGS. 13A–13F in sequence. In FIG. 13A a shrimp S is propelled upon the rails 84 by a water spray 85 towards the pinch block, the shrimp having just descended onto the rails from an unshown slide. The water jet or spray pushes it so that its head H is moved close to or in contact with the concave surface 94 of the pinch block, as shown in FIGS. 13B and 13C. The clamp 100 here has been rotated counterclockwise so as to bring its bottom edge into contact with the back of the shrimp. Next the clamp is pivoted further counterclockwise and the pivot arm 87 pivoted clockwise thereby causing the pinch block tine 99 to be driven sharply against the shrimp head H just below its mouth and the clamp 100 to engage the back of its head, all as shown in FIG. 13D. With the head now clamped to the pinch block, the pinch finger 104 is activated. Its end is driven along an arc passing just beneath the bottoms of the clamp and pinch block, as illustrated in FIG. 13E. In doing so it pinches off the head H from the first thoracic section of the tail T. As this occurs the neck and forward legs are held by the tine 99 and in the bottom cavity 95 attached to the head H with the hook or spade 96 located just below the neck and legs. Thus, as the pinch finger swings to the position shown in FIG. 13F it severs the head from the first thoracic section leaving the neck and forward legs usually attached to the head. The clamp and pinch block are then both rotated clockwise at a relative rate to separate from clamping engagement with the head. The water spray then propels the head H down the rail 84 and into an unshown collection bin. The tails T are collected in another unshown bin.

Figure 16:
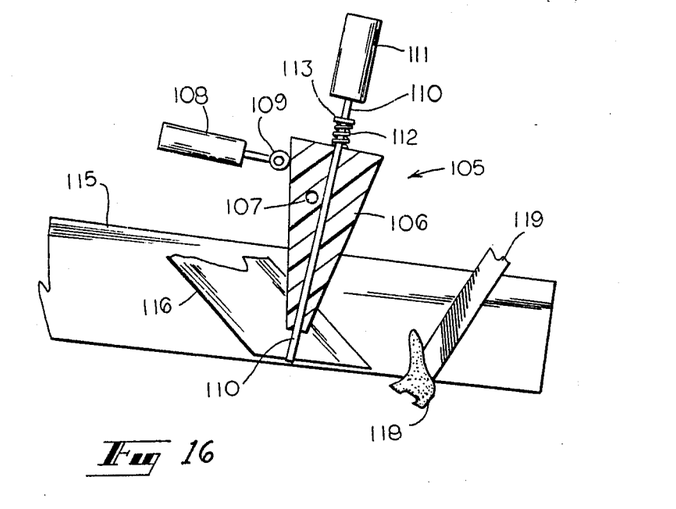
FIG. 16 is a side elevational view, shown partly in section, of apparatus for deheading shrimp in another preferred form.

Another form of the clamp is shown in FIG. 16. Here, a clamp indicated generally at 105 has a main body 106 that functions as a guide and which is mounted to a pivot 107. It is rotated about the pivot by means of a solenoid 108 coupled with the body 106 by a swivel attachment 109. A plunger 110 extends completely through a passage formed centrally through the main body or guide 106 to another solenoid 111. A compression spring 112, captured between the top of the body 106 and a plunger flange 113, maintains the plunger normally up so that its bottom end does not protrude significantly out of the bottom of the main body. In FIG. 16 the plunger is shown urged by the solenoid out from the bottom of the main body.

The clamp is shown in FIG. 16 located between a pair of rails 115 (the one nearing the viewer being removed for clarity of illustration) at the bottom of a slide 116 just upstream from a pinch block 118 mounted to the bottom of a swing arm 119. In operation the plunger is raised to permit a shrimp sliding down the slide 116 to pass beneath the clamp main body 106 as it moves onto the pair of rails 115. The plunger is then lowered and the main body and plunger pivoted counterclockwise thereby clamping the shrimp head to the pinch block 118. Deheading is then accomplished as previously described. Control sequencing is accomplished electronically by circuitry similar to that previously described.

Figure 17:
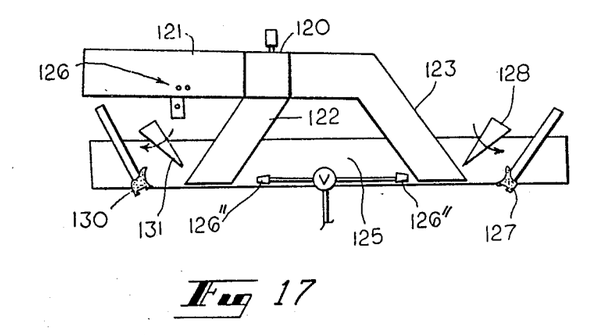
FIG. 17 is a diagram of another shrimp routing system that may be used in practicing the invention.

Finally, FIG. 17 illustrates another shrimp routing system that may be employed in practicing the invention. Here drop switch 120 is incorporated into a pair of conveyor rails 121 from which two chutes or slides 122 and 123 depend. Both of these chutes terminate within a pair of stationary support rails 125. Shrimp orientation is detected by a set of photodetectors 126 as previously described. Two water jets 126" are positioned adjacent the bottom so the two slides which are alternatively actuated by a valve V. A pinch block 127 and clamp 128 are located adjacent the bottom of slide while another pinch block 130 and clamp 131 are located adjacent the bottom of slide 122. Unshown pinch fingers are associated with each pinch block and clamp. With this system shrimp facing one direction are deheaded at pinch block 127 while shrimp facing the opposite way as they are conveyed on rails 126 are deheaded at pinch block 130.

It thus is seen that a method and apparatus is provided for processing shrimp on an automated bases which has never before been made commercially possible. It should, of course, be understood that the just described embodiments merely illustrate principles of the invention in preferred forms. Many modifications, additions and deletions may be made thereto without departure from the spirit and scope of the invention.

I claim:

1. Apparatus for deheading shrimp comprising means for supporting a shrimp in a generally upright orientation; a pinch block mounted adjacent said support means against which the head of the shrimp may be placed; a clamp mounted adjacent said support means for movement of the head of a shrimp supported upon said support means into clamped engagement with said pinch block; and a pinch finger mounted for movement along a path of travel passing closely adjacent to said pinch block for pinching off the body of a shrimp as its head is held clamped by said clamp to said pinch block.

2. The apparatus of claim 1 wherein said pinch block has a tine oriented towards said clamp.

3. The apparatus of claim 1 wherein said pinch block has a cavity formed in a lower surface thereof bounded by a tine into which cavity the neck and forward legs of a shrimp may be seated and held attached to its head as its body is pinched off by said pinch finger.

4. The apparatus of claim 1 wherein said pinch block is mounted for reciprocal arcuate movement towards and away from said clamp.

5. The apparatus of claim 1 wherein said clamp comprises a pivotal guide section mounted for pivotal movement adjacent said pinch block.

6. The apparatus of claim 5 wherein said clamp further comprises a plunger mounted for reciprocal movement on said pivotal guide between a position unobstructing movement of shrimp upon said support means and a position clamping the head of shrimp upon said support means against said pinch block.

7. Apparatus for deheading shrimp comprising a pair of rails mounted side by side spaced apart a distance to support shrimp generally uprightly in an elongated gap therebetween; a pinch block mounted between said rails; clamp means for clamping the head of a shrimp supported upon said pair of rails against said pinch block; and pinch means for pinching the body off of the head of a shrimp clamped by said clamping means to said pinch block.

8. The apparatus of claim 7 further comprising means for reciprocating said pair of rails with alternating outstroke and backstroke movements and with greater rail deacceleration at the ends of the outstrokes than at the ends of the backstrokes.

9. The apparatus of claim 7 wherein said pinch block has a cavity formed in a lower surface thereof bounded by a hook into which cavity the neck and forward legs portion of a shrimp may be seated and held attached to its head as its body is pinched off by said pinch means.

10. The apparatus of claim 7 wherein said pinch block is mounted for reciprocal, arcuate movement within said elongated gap.

11. The apparatus of claim 10 wherein said clamp means comprises a clamp mounted for reciprocal, arcuate movement within said elongated gap.

12. The apparatus of claim 7 wherein said pinch block has a cavity formed in a lower surface thereof bounded by a hook into which cavity the neck and forward legs portion of a shrimp may be seated and held attached to its head as its body is pinched off by said pinch means.

13. The apparatus of claim 7 wherein said clamp means comprises a pivotal guide section mounted for pivotal movement adjacent said pinch block.

14. The apparatus of claim 13 wherein said clamp means further comprises a plunger mounted for reciprocal movement on said pivotal guide between a position unobstructing movement of shrimp upon said support means and a position clamping the head of shrimp upon said support means against said pinch block.

15. A method of deheading shrimp comprising the steps of supporting the shrimp generally uprightly upon a pair of rails with the shrimp head positioned above a rail support contact point and the shrimp body positioned below the contact point; clamping the shrimp head against a pinch block; and severing the body from the clamped head.

16. The method of claim 15 wherein the neck and forward legs are held against the pinch block and to the shrimp head as the body is severed from the head.

* * * * *